United States Patent
Booker et al.

(10) Patent No.: US 12,169,873 B2
(45) Date of Patent: Dec. 17, 2024

(54) SYSTEM AND METHOD PROVIDING LOCATION BASED REGULATORY COMPLIANCE TOOL

(71) Applicant: Hartford Fire Insurance Company, Hartford, CT (US)

(72) Inventors: Shanita Michelle Booker, Enfield, CT (US); Carole E Lund, West Hartford, CT (US)

(73) Assignee: HARTFORD FIRE INSURANCE COMPANY, Hartford, CT (US)

( * ) Notice: Subject to any disclaimer, the term of this patent is extended or adjusted under 35 U.S.C. 154(b) by 527 days.

(21) Appl. No.: 17/332,108

(22) Filed: May 27, 2021

(65) Prior Publication Data

US 2022/0383437 A1    Dec. 1, 2022

(51) Int. Cl.
  *G06Q 50/18*    (2012.01)
  *G06Q 40/08*    (2012.01)
  *G06Q 40/12*    (2023.01)

(52) U.S. Cl.
  CPC .......... *G06Q 50/186* (2013.01); *G06Q 40/08* (2013.01); *G06Q 40/123* (2013.12)

(58) Field of Classification Search
  CPC ..... G06Q 50/186; G06Q 40/08; G06Q 40/123
  See application file for complete search history.

(56) References Cited

U.S. PATENT DOCUMENTS

| | | | |
|---|---|---|---|
| 8,200,775 B2 * | 6/2012 | Moore | H04L 63/20 709/217 |
| 2003/0074354 A1 * | 4/2003 | Lee | G06F 16/93 |
| 2005/0102173 A1 * | 5/2005 | Barker | G06Q 50/18 705/317 |
| 2008/0077503 A1 | 3/2008 | Zias et al. | |
| 2008/0133295 A1 | 6/2008 | Cappel et al. | |
| 2011/0213696 A1 | 9/2011 | Dodini | |

(Continued)

OTHER PUBLICATIONS

Brunton, "US Tax Treatment of Foreign Life Insurance Policies," [online], published on Mar. 13, 2020, available at: <https://www.taxintl.com/pfics-and-americans-abroad-with-foreign-life-insurance-policies.html > (Year: 2020).*

*Primary Examiner* — Richard W. Crandall
(74) *Attorney, Agent, or Firm* — Buckley, Maschoff & Talwalkar LLC

(57) ABSTRACT

Some embodiments are directed to a regulatory compliance tool implemented via a back-end application computer server. A location based regulatory compliance data store may contain electronic records associated with a set of locations. Each electronic record may include, for example, an electronic record identifier and at least one regulatory compliance parameter. The computer server may receive, from a user via an interactive graphical user interface display, a set of task indications associated with regulatory compliance. The computer server may also receive, from the user, a selected location from a set of potential locations. The computer server may then retrieve, from the location based regulatory compliance data store, information about the at least one regulatory compliance parameter associated with the selected location. The computer server may then update the display based on the retrieved information about the at least one regulatory compliance parameter associated with the selected location.

21 Claims, 12 Drawing Sheets

(56) References Cited

U.S. PATENT DOCUMENTS

| | | |
|---|---|---|
| 2011/0213697 A1 | 9/2011 | Dodini |
| 2016/0140668 A1* | 5/2016 | Maguire .............. G06Q 40/123 |
| | | 705/31 |
| 2020/0143633 A1 | 5/2020 | Alderucci et al. |

* cited by examiner

ENTERPRISE SYSTEM

REGULATORY COMPLIANCE TOOL

LOCATION BASED REGULATORY COMPLIANCE TOOL
(Claim Handler Checklist)

Complete the checklist below to confirm that the form contains the necessary information for documentation and retention purposes.

Checklist to Confirm Full Completion for Document Retention (ALL REQUIRED):

310
- ● confirmed: Task Indication A
- ○ confirmed: Task Indication B
- ○ confirmed: Task Indication C
- ○ confirmed: Task Indication D Some locations have specific rules and regulations, and when the beneficiary properly claims the benefit of an existing rule, a different requirement may apply. Review Part II to see if all the necessary information has been gathered to properly claim benefits.

To perform a full review, choose a location from the dropdown list below.
- If there is no rule for that location, a claim for Benefits in Part II is not applicable.
- If there is a rule, complete and review the Checklist/Suggested Communication portion below.

Rule Determination:
Choose the beneficiary's resident location from the dropdown list below (Locations Listed A-Z):

[ Select Location 320 ]

Checklist/Suggested Communication for Claiming Benefits (ALL REQUIRED):

330
- ○ confirmed: Task Indication Y
- ○ confirmed: Task Indication Z
- ○ Suggest that the beneficiary review the Rule to properly claim the benefit outlined below:
Regulations Name, Rule Identifier, Rule Access the Rule: link

390

( Update 350 )

MATRIX OF RULES

| Location | Rule Agreement | Rule ID | Benefit | Effective Date | Link |
|---|---|---|---|---|---|
| Location A | N | na | na | na | link |
| Location B | Y | R_101 | No Paperwork Required | 1-Jan-2015 | link |
| Location C | N | na | na | na | link |
| Location D | Y | R_102 | Full Payment | 26-Oct-1964 | link |

FIG. 4

FORM W-8BEN Certificate of Foreign Status of Beneficial Owner
(US Tax Withholding/ Reporting)

Interest paid to a foreign beneficiary is generally subject to 30% US Federal income tax withholding. The W-8BEN should be properly completed and executed. Complete the checklist below to confirm that the form contains the necessary information for documentation and retention purposes.

Form W-8BEN - Checklist to Confirm Full Completion for Document Retention (ALL REQUIRED):

710
- ● confirmed: W-8BEN Received is the Current Version
- ○ confirmed: Part I, Box 3 - Permanent Residence Address
- ○ confirmed: Country of Citizenship AND Permanent Residence Address are NON-U.S.
- ○ confirmed: Part III, Certification - Signed and Dated (Required with Reasonable/Current Date)

Some countries have tax treaties with the United States, and when the beneficiary properly claims the benefit of an existing tax treaty, a lower rate of tax withholding may apply on the interest. Review Part II to see if all the necessary information has been gathered to properly claim tax treaty benefits.

To perform a full review of the beneficiary's W-8BEN, choose the country of residence from the dropdown list below.
- If there is no treaty between the US and the resident country, a claim for Tax Treaty Benefits in Part II is not applicable.
- If there is a tax treaty between the US and the resident country, complete and review the Checklist/Suggested Communication portion below.

United States Treaty Agreement Determination:
Choose the beneficiary's resident country from the dropdown list below (Countries Listed A-Z):

[ Canada 720 ]

Form W-8BEN - Checklist/Suggested Communication for Claiming Treaty Benefits (ALL REQUIRED):
730
- ○ Part I, Box 5 - SSN or ITIN (or Part I, Box 6 - Foreign TIN - Required if Box 5 is not completed)
- ○ Part I, Box 8 – Date of Birth
- ○ Suggest that the beneficiary review the Tax Treaty Agreement to properly claim the % of withholding tax outlined below:
  Canada, Article XI, Paragraph 1, 10% Withholding on Interest Access the Tax Treaty Agreement: link ( Update 750 )  ← 790

*FIG. 7*

MATRIX OF TREATIES

| Resident Country | Treaty | Article and Paragraph No. | Withholding % | Effective Date | Link |
|---|---|---|---|---|---|
| Australia | Y | Article 11, Paragraph 2 | 10% | 1-Dec-1983 | link |
| Burma | N | na | na | na | link |
| Canada | Y | Article XI, Paragraph 1 | 0% | 1-Jan-1985 | link |
| China | Y | Article 10, Paragraph 2 | 10% | 1-Jan-1987 | link |

# SYSTEM AND METHOD PROVIDING LOCATION BASED REGULATORY COMPLIANCE TOOL

TECHNICAL FIELD

The present application generally relates to computer systems and more particularly to computer systems that are adapted to accurately and/or automatically ensure compliance with regulatory requirements.

BACKGROUND

An enterprise may want to ensure compliance with regulatory requirements. For example, an insurer might want to ensure that tax forms are correctly filled out and that various withholding requirements are correctly determined and applied. In some cases, however, the requirements may be complex and/or vary based on a geographic location (e.g., different countries might enter into various treaties or agreements resulting in different withholding requirements). Manually tracking compliance with such regulations can be a time-consuming and error prone process—especially when a substantial number of jurisdictions are involved.

It would be desirable to provide improved systems and methods to accurately and/or automatically ensure compliance with regulatory requirements. Moreover, the results should be easy to access, understand, interpret, update, etc.

SUMMARY OF THE INVENTION

According to some embodiments, systems, methods, apparatus, computer program code and means are provided to accurately and/or automatically ensure compliance with regulatory requirements in a way that provides fast and useful results and that allows for flexibility and effectiveness when responding to those results.

Some embodiments are directed to a regulatory compliance tool implemented via a back-end application computer server. A location based regulatory compliance data store may contain electronic records associated with a set of locations. Each electronic record may include, for example, an electronic record identifier and at least one regulatory compliance parameter. The computer server may receive, from a user via an interactive graphical user interface display, a set of task indications associated with regulatory compliance. The computer server may also receive, from the user, a selected location from a set of potential locations. The computer server may then retrieve, from the location based regulatory compliance data store, information about the at least one regulatory compliance parameter associated with the selected location. The computer server may then update the display based on the retrieved information about the at least one regulatory compliance parameter associated with the selected location.

Some embodiments comprise: means for receiving, at a back-end application computer server from a user via an interactive graphical user interface display, a set of task indications associated with regulatory compliance; means for receiving, from the user, a selected location from a set of potential locations; means for retrieving, from a location based regulatory compliance data store, information about the at least one regulatory compliance parameter associated with the selected location, wherein the location based regulatory compliance data store contains electronic records associated with the set of potential locations, each electronic record including an electronic record identifier and at least one regulatory compliance parameter; and means for updating the interactive graphical user interface display based on the retrieved information about the at least one regulatory compliance parameter associated with the selected location and the set of received task indications associated with regulatory compliance.

In some embodiments, a communication device associated with a back-end application computer server exchanges information with remote devices in connection with an interactive graphical user interface. The information may be exchanged, for example, via public and/or proprietary communication networks.

A technical effect of some embodiments of the invention is an improved and computerized way to accurately and/or automatically ensure compliance with regulatory requirements in a way that provides fast and useful results. With these and other advantages and features that will become hereinafter apparent, a more complete understanding of the nature of the invention can be obtained by referring to the following detailed description and to the drawings appended hereto.

BRIEF DESCRIPTION OF THE DRAWINGS

FIG. 3 is a regulatory compliance tool display according to some embodiments.

FIG. 4 is a matrix of rules in accordance with some embodiments.

FIG. 7 is a Form W-8BEN compliance tool display according to some embodiments.

FIG. 8 is a matrix of treaties in accordance with some embodiments.

FIG. 9 is a tax form guidance display according to some embodiments.

DETAILED DESCRIPTION

Figure 1:
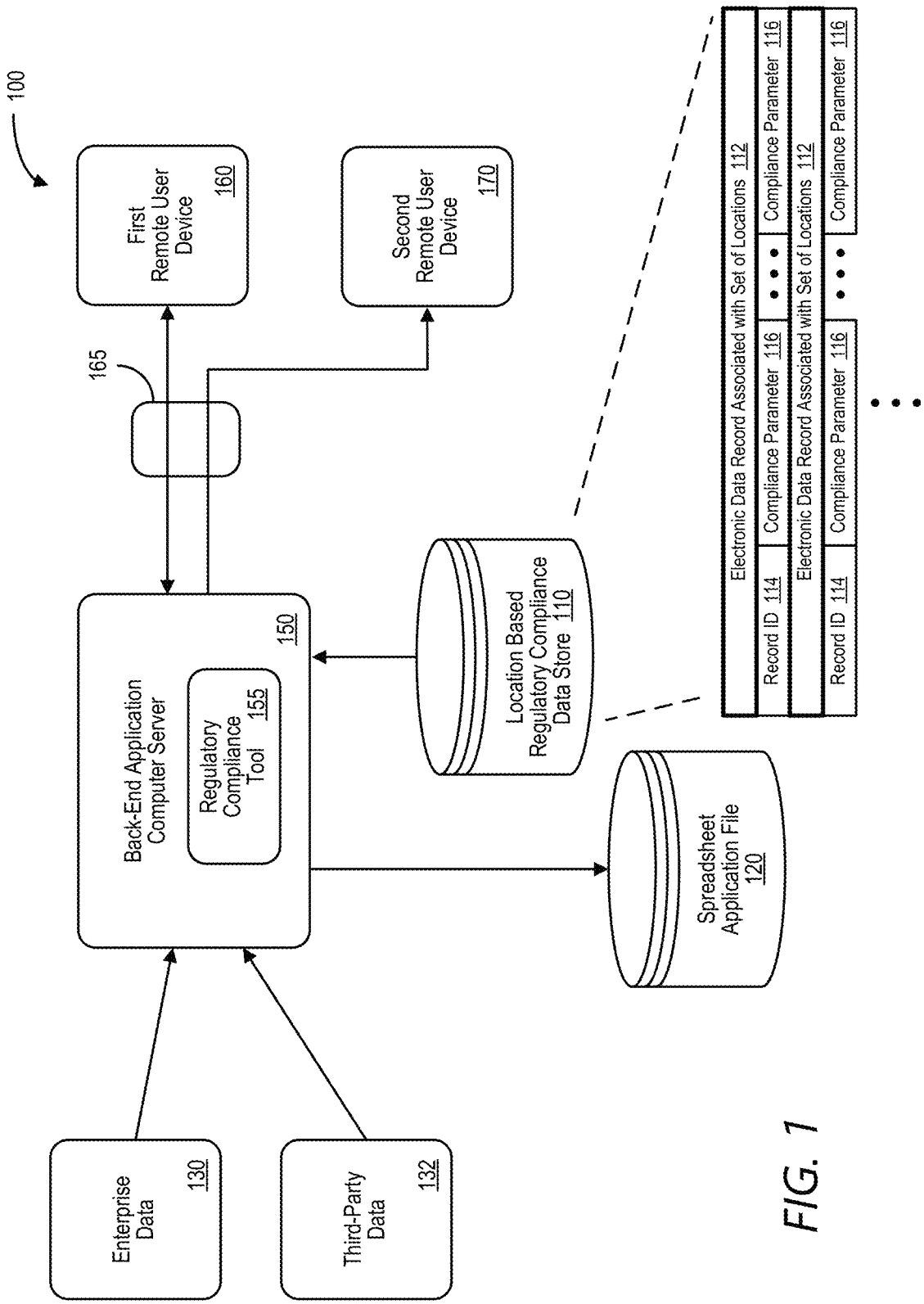
FIG. 1 is a high-level block diagram of a regulatory compliance tool in accordance with some embodiments.

Before the various exemplary embodiments are described in further detail, it is to be understood that the present invention is not limited to the particular embodiments described. It is also to be understood that the terminology used herein is for the purpose of describing particular embodiments only and is not intended to limit the scope of the claims of the present invention.

In the drawings, like reference numerals refer to like features of the systems and methods of the present invention. Accordingly, although certain descriptions may refer only to certain figures and reference numerals, it should be understood that such descriptions might be equally applicable to like reference numerals in other figures.

The present invention provides significant technical improvements to facilitate data analytics associated with regulatory compliance tool. The present invention is directed to more than merely a computer implementation of a routine or conventional activity previously known in the industry as it provides a specific advancement in the area of electronic record analysis by providing improvements in the operation of a computer system that tracks compliance in accordance with a geographic location. The present invention provides improvement beyond a mere generic computer implementation as it involves the novel ordered combination of system elements and processes to provide improvements in the speed at which such an analysis may be performed. Some embodiments of the present invention are directed to a system adapted to automatically analyze electronic records, aggregate data from multiple sources, determine applicable regulations, etc. Moreover, communication links and messages may be automatically established, aggregated, formatted, exchanged, etc. to improve network performance (e.g., by reducing an amount of network messaging bandwidth and/or storage required to support regulatory compliance).

FIG. 1 is a high-level block diagram of a regulatory compliance tool or system 100 according to some embodiments of the present invention. In particular, the system 100 includes a back-end application computer server 150 that may access information in a location based regulatory compliance data store 110 (e.g., storing a set of electronic records associated with sets of locations 112, each record including, for example, one or more record identifiers 114, compliance parameters 116, etc.). The back-end application computer server 150 may also store information into other data stores, such as a spreadsheet application file 120 and utilize a regulatory compliance tool 155 to view, analyze, and/or update the electronic records. The back-end application computer server 150 may also exchange information with a first remote user device 160 and a second remote user device 170 (e.g., via a firewall 165). According to some embodiments, an interactive graphical user interface platform of the back-end application computer server 150 (and, in some cases, enterprise data 130 and/or third-party data 132) may facilitate forecasts, decisions, predictions, and/or the display of results via one or more remote administrator computers (e.g., to identify appropriate rules or regulations) and/or the remote user devices 160, 170. For example, the first remote user device 160 may transmit annotated and/or updated information to the back-end application computer server 150. Based on the updated information, the back-end application computer server 150 may adjust data in the location based regulatory compliance data store 110 and/or the spreadsheet application file 120 and the change may be viewable via the second remote user device 170. Note that the back-end application computer server 150 and/or any of the other devices and methods described herein might be associated with a third party, such as a vendor that performs a service for an enterprise.

The back-end application computer server 150 and/or the other elements of the system 100 might be, for example, associated with a Personal Computer ("PC"), laptop computer, smartphone, an enterprise server, a server farm, and/or a database or similar storage devices. According to some embodiments, an "automated" back-end application computer server 150 (and/or other elements of the system 100) may facilitate the automated access and/or update of electronic records in the spreadsheet application file 120. As used herein, the term "automated" may refer to, for example, actions that can be performed with little (or no) intervention by a human.

As used herein, devices, including those associated with the back-end application computer server 150 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The back-end application computer server 150 may store information into and/or retrieve information from the location based regulatory compliance data store 110 and/or the spreadsheet application file 120. The data elements 110, 120 may be locally stored or reside remote from the back-end application computer server 150. As will be described further below, the location based regulatory compliance data store 110 may be used by the back-end application computer server 150 in connection with an interactive user interface to access and update electronic records. Although a single back-end application computer server 150 is shown in FIG. 1, any number of such devices may be included. Moreover, various devices described herein might be combined according to embodiments of the present invention. For example, in some embodiments, the back-end application computer server 150 and location based regulatory compliance data store 110 might be co-located and/or may comprise a single apparatus.

Figure 2:
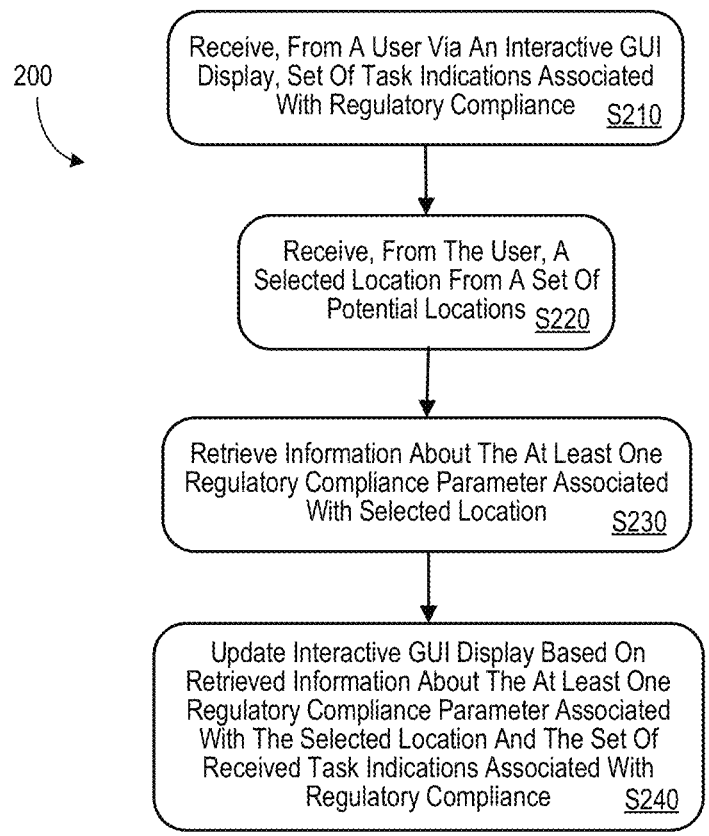
FIG. 2 illustrates a regulatory compliance tool method according to some embodiments of the present invention.

Note that the system 100 of FIG. 1 is provided only as an example, and embodiments may be associated with additional elements or components. According to some embodiments, the elements of the system 100 automatically transmit information associated with an interactive user interface display over a distributed communication network. FIG. 2 illustrates a method 200 that might be performed by some or all of the elements of the system 100 described with respect to FIG. 1, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, a back-end application computer server may receive, from a user via an interactive graphical user interface display, a set of task indications associated with regulatory compliance. At S220, the system may receive, from the user, a selected location from a set of potential locations. At S230, the system may retrieve, from a location based regulatory compliance data store, information about the at least one regulatory compliance parameter associated with the selected location. The location based regulatory compliance data store may, for example, contain electronic records associated with the set of potential locations, each electronic record including an electronic record identifier and at least one regulatory compliance parameter. At S240, the system may update the interactive graphical user interface display based on the retrieved information about the at least one regulatory compliance parameter associated with the selected location and the set of received task indications associated with regulatory compliance.

The data analyzed by the system may be presented on a Graphical User Interface ("GUI"). For example, FIG. 3 is a regulatory compliance tool display 300 including graphical representations of received task indications 310 associated with regulatory compliance (e.g., task indication A, task indication B, etc.). Moreover, user selection of the circular radio button next to "confirmed" for each task indication 310 (e.g., via touchscreen or computer mouse pointer 390) may toggle between "full" (confirmed) and "empty" (not confirmed). The display 300 may further let the user "Select Location" icon 320. Depending on the selected location, another set of task indications 330 may be displayed. Selection of a portion or element of the display 300 might result in the presentation of additional information about that portion or element (e.g., a popup window presenting a data source or result table) or let an operator or administrator enter or annotate additional information about one or more tasks (e.g., based on his or her experience and expertise). Selection of an "Update" icon 350 (e.g., by touchscreen or computer mouse pointer 390) might cause the system or platform to save changes, transmit a report to another party, etc.

Thus, the "selection location" icon 320 may impact the display of task indications 330. For example, FIG. 4 is a matrix of rules 400 in accordance with some embodiments. In particular, the matrix of rules 400 defines benefits for each location, an effective date, a link to more details about each rule and/or benefit etc. This information can be used by the system to update and/or alter the display of task indications 330.

According to some embodiments, the system may automatically establish a communication link and transmit a report based on the updated interactive GUI display. For example, for example, once all required tasks have been "confirmed" by the user or claim handler, the system might automatically send a copy of the report to a beneficiary, an administrator, etc. According to some embodiments, the system may review at least one source document and automatically generate at least one task indication based on the result of the review. For example, the system might review a tax form completed by a beneficiary and automatically determine which tasks have already been completed. According to some embodiments, this automatic review might be performed periodically, such as by performing the review on an hourly basis, a daily basis, etc. In other embodiments, the review might be automatically performed whenever a source document is submitted or is changed by a claim handler. According to some embodiments, the system may automatically compile a set of supporting documents associated with regulatory compliance. For example, the system might gather life insurance documents, relevant treaty data, etc. and prepare a report for a tax compliance officer. In some embodiments, selection of an "email report" by a claim handler might trigger the system to automatically compile such a report and transmit the report (or a link to the report) to one or more appropriate communication addresses.

FIGS. 1 through 4 illustrate a general regulatory compliance solution. FIGS. 5 through 9 will now describe how such a solution might be applied to the US Internal Revenue Service ("IRS") Form W-8BEN. In general, Form W-8 BEN is given to a withholding agent or payer when a foreign person is the beneficial owner of an amount subject to withholding. The person may then submit Form W-8 BEN when requested by the withholding agent or payer (whether or not the person is claiming a reduced rate of, or exemption from, withholding).

Figure 5:
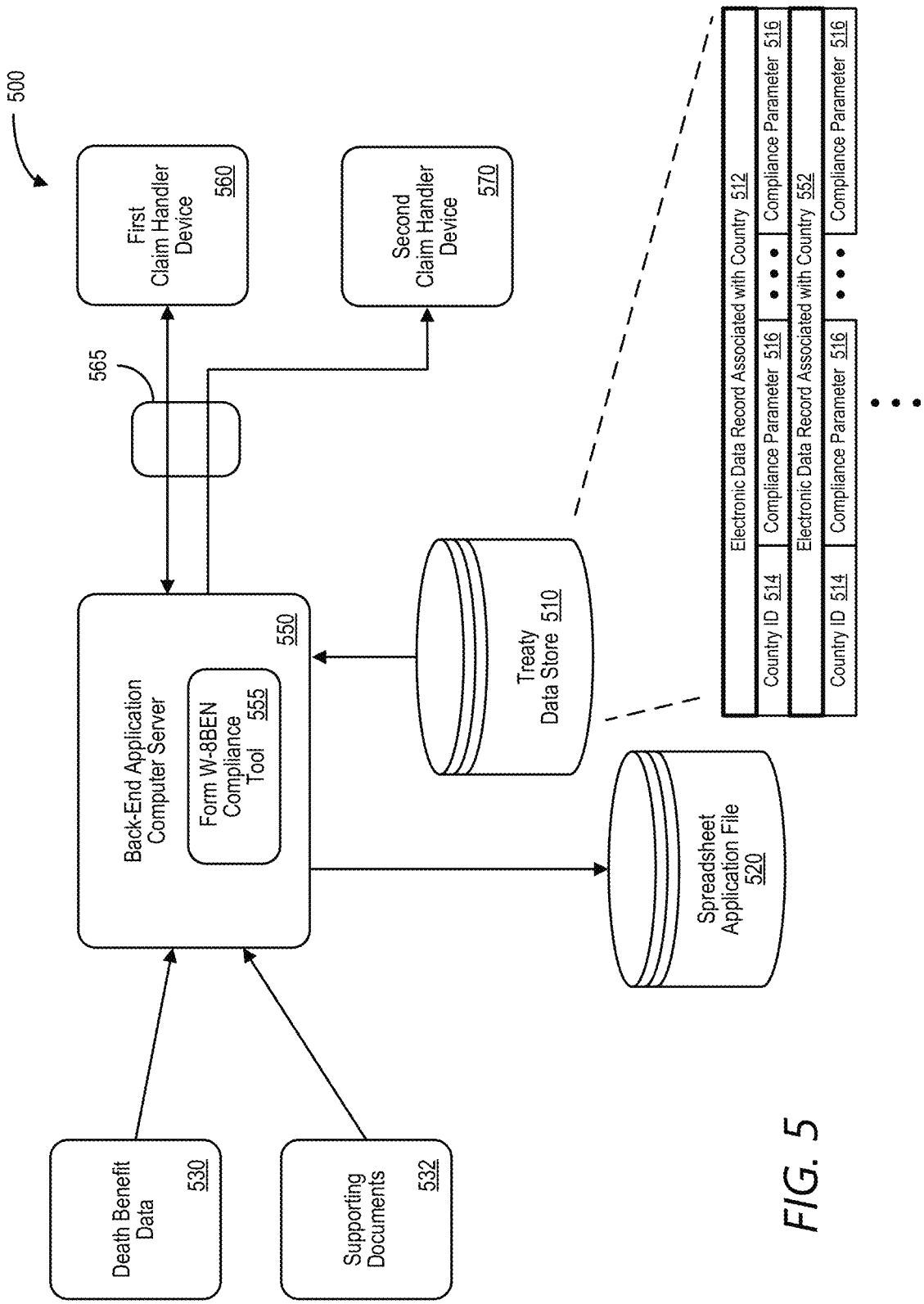
FIG. 5 is a high-level block diagram of a Form W-8BEN compliance tool in accordance with some embodiments.

FIG. 5 is a high-level block diagram of a Form W-8BEN compliance tool or system 500 according to some embodiments of the present invention. As before, the system 500 includes a back-end application computer server 550 that may access information in a treaty data store 510 (e.g., storing a set of electronic records associated with countries 512, each record including, for example, one or more country identifiers 514, compliance parameters 516, etc.). The back-end application computer server 550 may also store information into other data stores, such as a spreadsheet application file 520 and utilize a Form-8BEN compliance tool 555 to view, analyze, and/or update the electronic records. The back-end application computer server 550 may also exchange information with a first remote claim handler device 560 and a second remote claim handler device 570 (e.g., via a firewall 565). According to some embodiments, an interactive GUI platform of the back-end application computer server 550 (and, in some cases, death benefit data 530 and/or supporting documents 532) may facilitate forecasts, decisions, predictions, and/or the display of results via one or more remote administrator computers (e.g., to identify appropriate withholding amounts) and/or the remote claim handler devices 560, 570. For example, the first remote claim handler device 560 may transmit annotated and/or updated information to the back-end application computer server 550. Based on the updated information, the back-end application computer server 550 may adjust data in the treaty data store 510 and/or the spreadsheet application file 520 and the change may be viewable via the second remote claim handler device 570.

The back-end application computer server 550 and/or the other elements of the system 500 might be, for example, associated with a PC, laptop computer, smartphone, an enterprise server, a server farm, and/or a database or similar storage devices. As used herein, devices, including those associated with the back-end application computer server 550 and any other device described herein, may exchange information via any communication network which may be one or more of a LAN, a MAN, a WAN, a proprietary network, a PSTN, a WAP network, a Bluetooth network, a wireless LAN network, and/or an IP network such as the Internet, an intranet, or an extranet.

The back-end application computer server 550 may store information into and/or retrieve information from the treaty data store 510 and/or the spreadsheet application file 520. The data elements 510, 520 may be locally stored or reside remote from the back-end application computer server 550. As will be described further below, the treaty data store 510 may be used by the back-end application computer server 550 in connection with an interactive user interface to access and update electronic records. Although a single back-end application computer server 550 is shown in FIG. 5, any number of such devices may be included.

Figure 6:
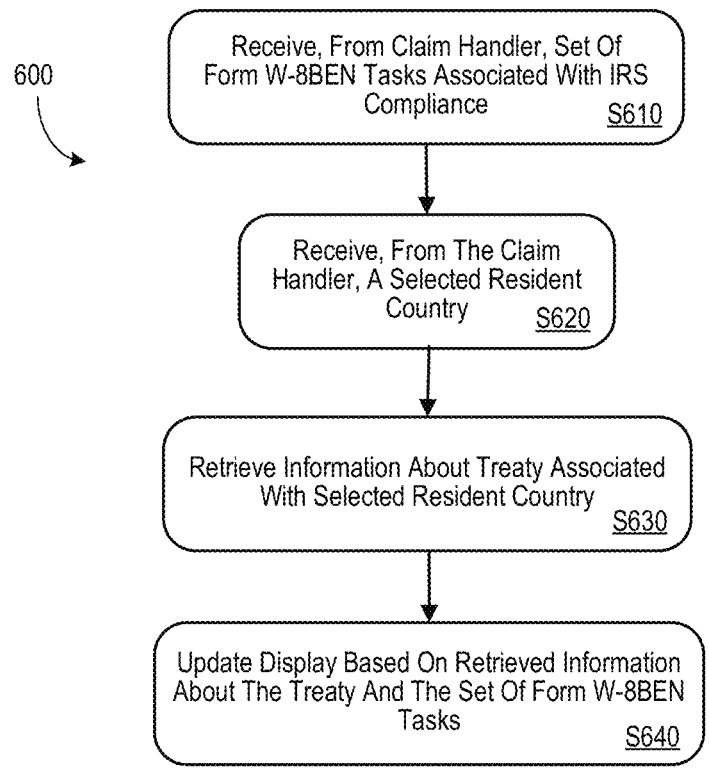
FIG. 6 illustrates a Form W-8BEN compliance tool method according to some embodiments of the present invention.

FIG. 6 illustrates a Form W-8BEN compliance method 600 that might be performed by some or all of the elements of the system 500 described with respect to FIG. 5, or any other system, according to some embodiments of the present invention. At S610, a back-end application computer server may receive, from a claim handler via an interactive GUI display, a set of Form W-8BEN tasks associated with IRS compliance (e.g., associated with completion of a portion of a tax form). At S620, the system may receive, from the claim handler, a selected resident country from a set of potential resident countries. At S630, the system may retrieve, from a treaty data store, information about treaty associated with the selected resident location. At S640, the system may update the interactive GUI display based on the retrieved information about the at least one regulatory compliance parameter associated with the selected location and the set of Form W-8BEN tasks.

The claim handler might comprise a life insurance claim handler and the selected resident country might represent a resident country of a life insurance policy beneficiary. According to some embodiments, at least one regulatory compliance parameter comprises a rate of withholding of interest income and the regulatory compliance parameters in a matrix of treaties further includes an article and paragraph number, an effective date, a link to a source treaty document, etc.

The data analyzed by the system may be presented on a GUI. For example, FIG. 7 is a Form W-8BEN compliance tool display 700 including graphical representations of received task indications 710 associated with regulatory compliance (e.g., completion of permanent resident address, signed and dated confirmation, etc.). Moreover, user selection of the circular radio button next to "confirmed" for each task indication 710 (e.g., via touchscreen or computer mouse pointer 790) may toggle between "full" (confirmed) and "empty" (not confirmed). The display 700 may further let the user "Select Resident Country" icon 720. Depending on the selected resident country, another set of task indications 730 may be displayed. Selection of an "Update" icon 750 (e.g., by touchscreen or computer mouse pointer 790) might cause the system or platform to save changes, transmit a report to another party, etc.

Thus, the "selection location" icon 720 (e.g., "Canada" as illustrated in FIG. 7) may impact the display of task indications 730. For example, FIG. 8 is a matrix of treaties 800 in accordance with some embodiments. In particular, the matrix of treaties 800 defines withholding percentages for each resident country, treaty article and paragraph numbers, an effective date, a link to more details about each treaty etc. This information can be used by the system to update and/or alter the display of task indications 730. According to some embodiments, the treaty information might be periodically updated, such as by manually or automatically updating the treaty information once per quarter, once per year, etc. In other embodiments, the treaty information might be automatically pushed from a source data store in substantially real time (e.g., after a treaty is updated or a new treaty takes effect) or might be automatically pulled from one or more data stores.

Figure 9:
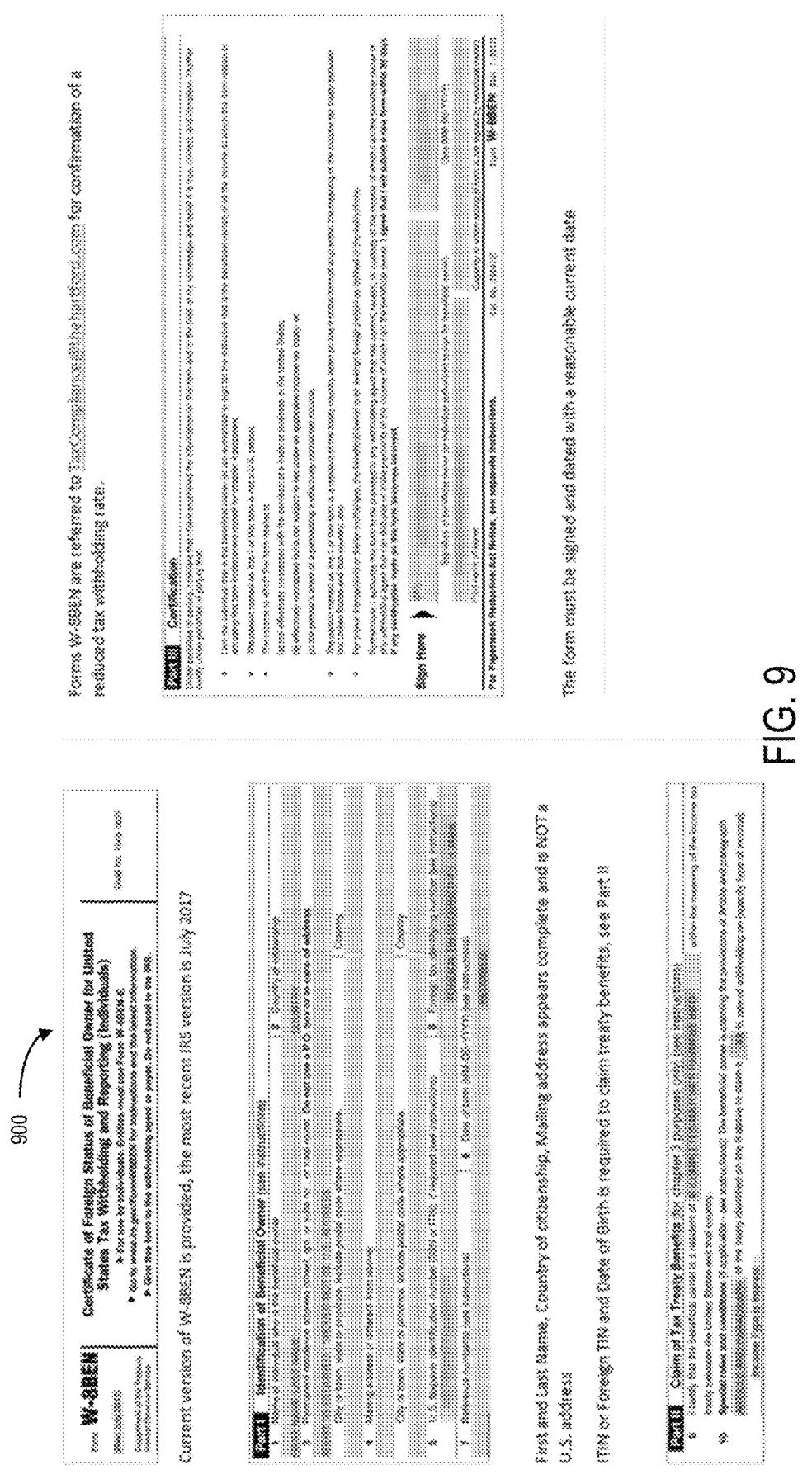

According to some embodiments, another display may provide guidance as to the completion of a form such as Form W-8BEN. For example, FIG. 9 is a tax form guidance display 900 according to some embodiments. This display 900 might, for example, highlight which areas a beneficiary should complete, what information needs to go into each portion of the form, etc.

Figure 10:
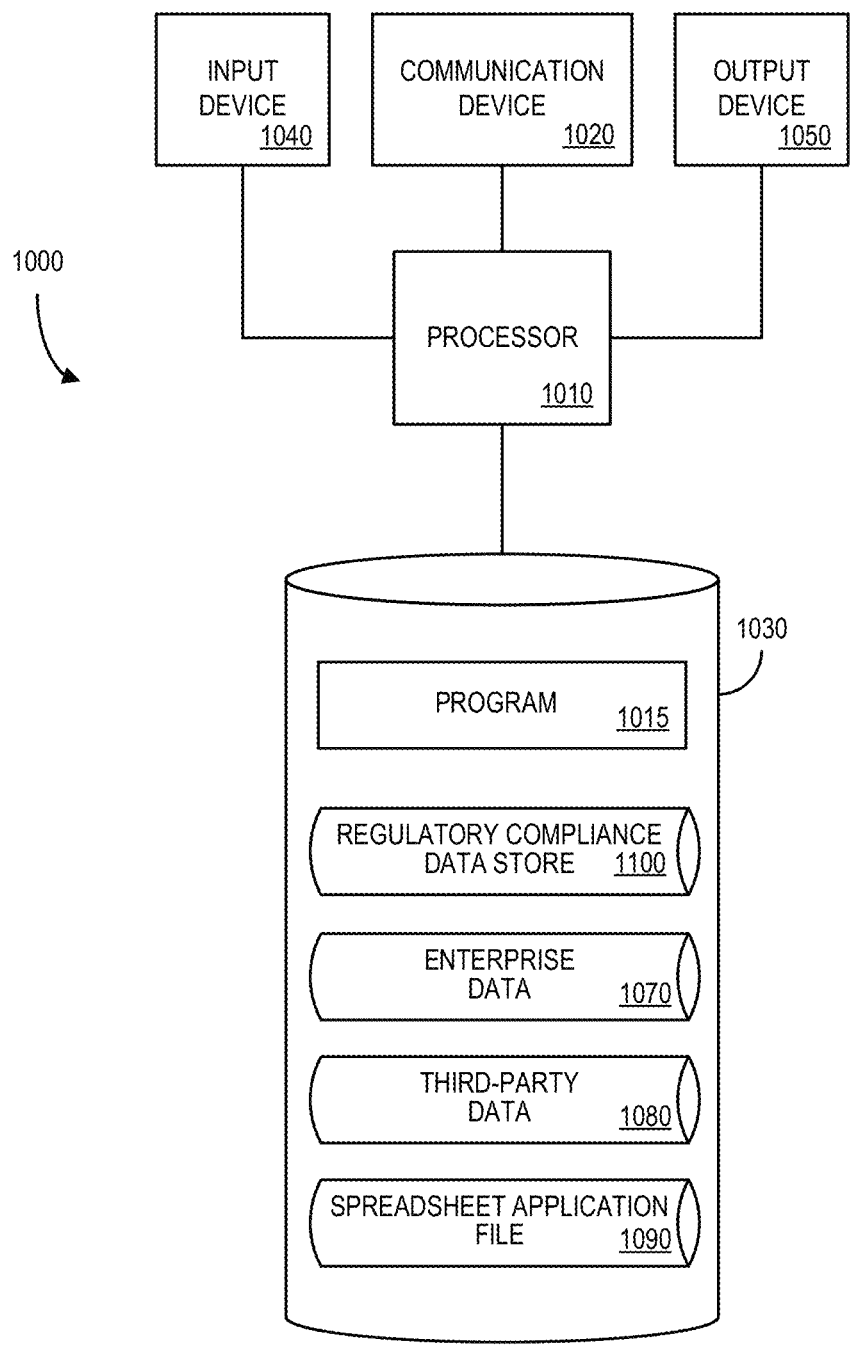
FIG. 10 is a block diagram of an apparatus in accordance with some embodiments of the present invention.

The embodiments described herein may be implemented using any number of different hardware configurations. For example, FIG. 10 illustrates an apparatus 1000 that may be, for example, associated with the system 100 described with respect to FIG. 1. The apparatus 1000 comprises a processor 1010, such as one or more commercially available Central Processing Units ("CPUs") in the form of one-chip microprocessors, coupled to a communication device 1020 configured to communicate via a communication network (not shown in FIG. 10). The communication device 1020 may be used to communicate, for example, with one or more remote third-party business or compliance platforms, administrator computers, and/or communication devices (e.g., PCs and smartphones). Note that communications exchanged via the communication device 1020 may utilize security features, such as those between a public internet user and an internal network of an insurance company and/or an enterprise. The security features might be associated with, for example, web servers, firewalls, and/or PCI infrastructure. The apparatus 1000 further includes an input device 1040 (e.g., a mouse and/or keyboard to enter information about data sources, treaties, third-parties, etc.) and an output device 1050 (e.g., to output reports regarding compliance analysis results, recommended changes, alerts, etc.).

The processor 1010 also communicates with a storage device 1030. The storage device 1030 may comprise any appropriate information storage device, including combinations of magnetic storage devices (e.g., a hard disk drive), optical storage devices, mobile telephones, and/or semiconductor memory devices. The storage device 1030 stores a program 1015 and/or regulatory compliance tool or application for controlling the processor 1010. The processor 1010 performs instructions of the program 1015, and thereby operates in accordance with any of the embodiments described herein. For example, the processor 1010 may receive, from a user via an interactive GUI display, a set of task indications associated with regulatory compliance. The processor 1010 may also receive, from the user, a selected location from a set of potential locations. The processor 1010 may then retrieve, from the location based regulatory compliance data store, information about the at least one regulatory compliance parameter associated with the selected location. The processor 1010 may then update the display based on the retrieved information about the at least one regulatory compliance parameter associated with the selected location.

The program 1015 may be stored in a compressed, uncompiled and/or encrypted format. The program 1015 may furthermore include other program elements, such as an operating system, a database management system, and/or device drivers used by the processor 1010 to interface with peripheral devices.

As used herein, information may be "received" by or "transmitted" to, for example: (i) the back-end application computer server 1000 from another device; or (ii) a software application or module within the back-end application computer server 1000 from another software application, module, or any other source.

In some embodiments (such as shown in FIG. 10), the storage device 1030 further stores regulatory compliance data store 1100 (e.g., defining applicable rules or treaties), enterprise data 1070 (e.g., associated with life insurance policies), third-party data 1080 (e.g., with third-party business or compliance data), and a spreadsheet application file 1090. An example of database that might be used in connection with the apparatus 1000 will now be described in detail with respect to FIG. 11. Note that the database described herein is only an example, and additional and/or different information may be stored therein. Moreover, various databases might be split or combined in accordance with any of the embodiments described herein. For example, the spreadsheet application file 1090 might be combined and/or linked to each other within the program 1015.

Figure 11:
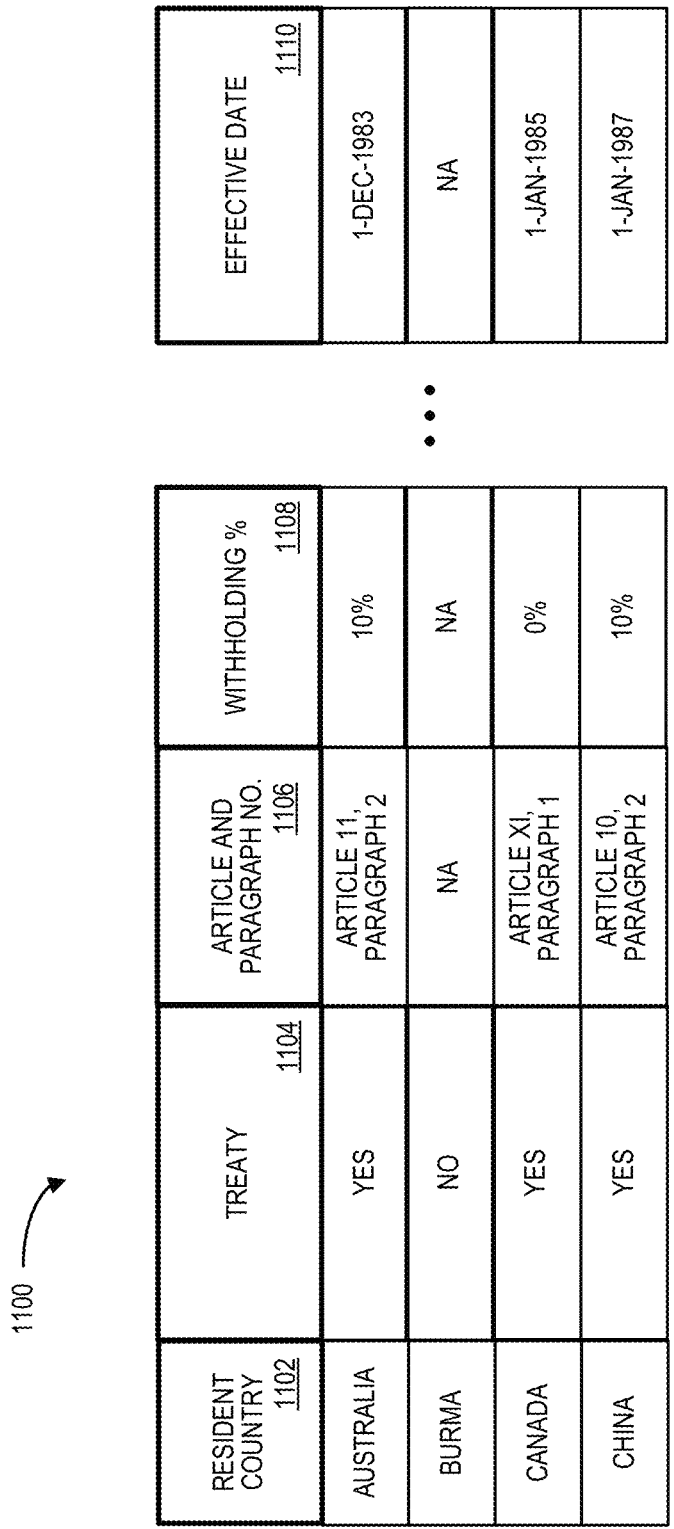
FIG. 11 is a portion of a regulatory compliance data store according to some embodiments.

Referring to FIG. 11, a table is shown that represents the regulatory compliance data store 1100 that may be stored at the apparatus 1000 according to some embodiments. The table may include, for example, entries associated with agreements between the US and various other countries. The table may also define fields 1102, 1104, 1106, 1108, 1110 for each of the entries. The fields 1102, 1104, 1106, 1108, 1110 may, according to some embodiments, specify: a resident country identifier 1102, an indication 1104 as to whether an applicable treaty exists, article and paragraph numbers 1106, a withholding percentage 1108, and an effective date 1110. The regulatory compliance data store 1100 may be created and updated, for example, based on information electrically received from various data sources (e.g., including when an existing treaty is modified or a new treaty takes effect) that may be associated with an insurer.

The resident country identifier 1102 may be, for example, a unique alphanumeric code identifying a particular country and the indication 1104 may define whether an applicable treaty exists between the US and that particular country. The article and paragraph numbers 1106 might point to a relevant portion of the treaty (if one exists). The withholding percentage 1108 might indicate how much of an interest benefit should be withheld by the insurer, and the effective date 1110 might indicate when the treaty was agreed to (and is therefore enforceable).

Thus, embodiments may provide an automated and efficient way to help ensure compliance with rules and regulations. The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the displays described herein might be implemented as a virtual or augmented reality display and/or the databases described herein may be combined or stored in external systems). Moreover, although embodiments have been described with respect to specific types of enterprises, embodiments may instead be associated with other types of enterprises in additional to and/or instead of those described herein (e.g., banks or other financial institutions). Similarly, although certain types of regulations and parameters were described in connection some embodiments herein, other types of regulations and parameters might be used instead.

Figure 12:
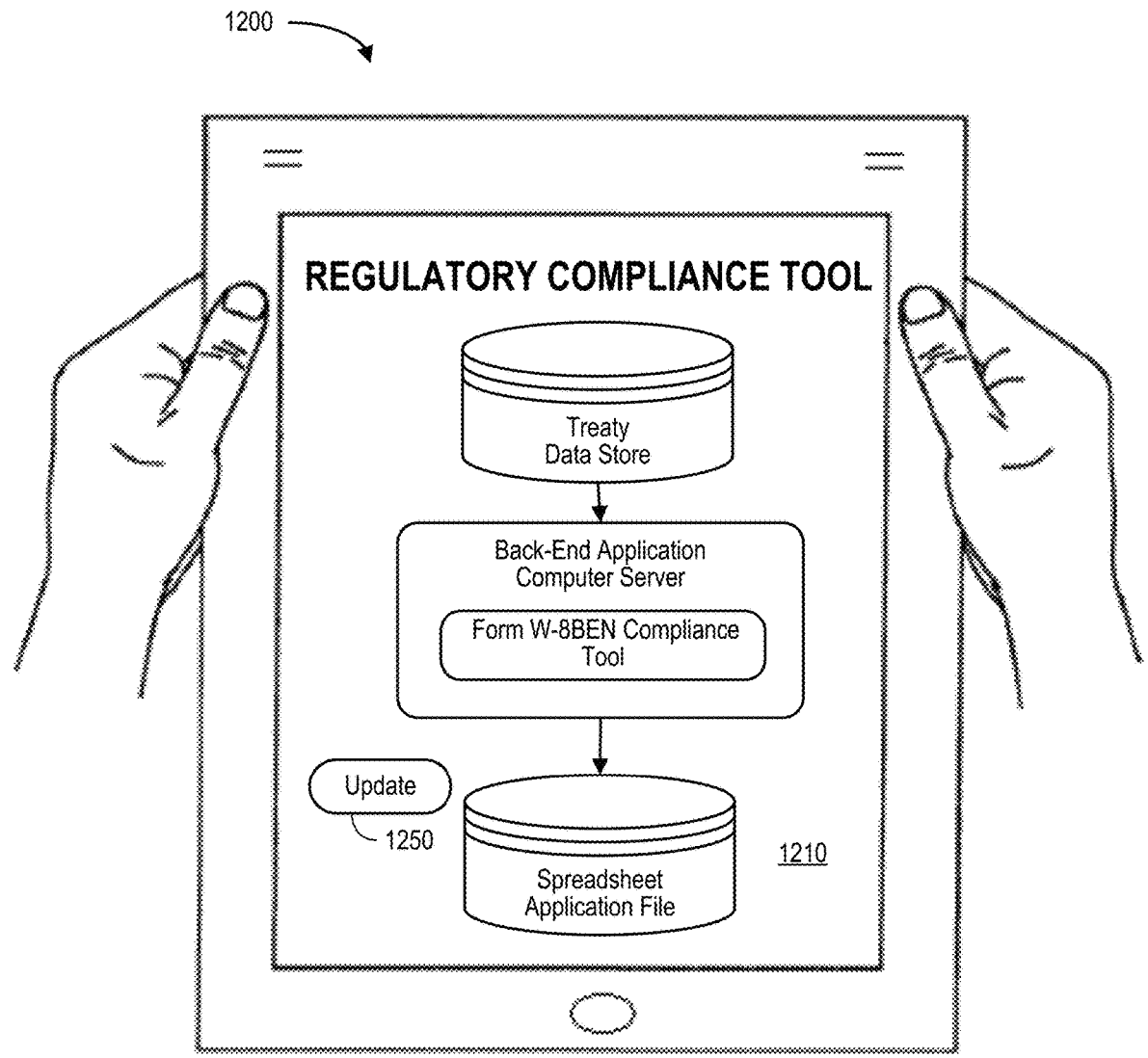
FIG. 12 illustrates a tablet computer with a regulatory compliance tool display according to some embodiments.

Note that the displays and devices illustrated herein are only provided as examples, and embodiments may be associated with any other types of user interfaces. For example, FIG. 12 illustrates a tablet computer 1200 with a regulatory compliance tool display 1210 according to some embodiments. The regulatory compliance tool display 1210 shows elements of a compliance system that might include selectable data that can be modified by a user of the handheld computer 1200 (e.g., via an "Update" icon 1250) to view updated regulatory compliance tool spreadsheet data associated with an enterprise (e.g., including, in some embodiments, a checklist with an appropriate withholding percentage).

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed:

1. A regulatory compliance tool implemented via a back-end application computer server, comprising:
 (a) a location based regulatory compliance data store that contains electronic records associated with a set of potential locations, each electronic record including an electronic record identifier and at least one regulatory compliance parameter;
 (b) the back-end application computer server, coupled to the location based regulatory compliance data store, including:
 a computer processor, and
 a computer memory, coupled to the computer processor, storing instructions that, when executed by the computer processor cause the back-end application computer server to:
 (i) receive, from a user via an interactive graphical user interface display, selection of one or more radio buttons with a mouse pointer, the radio buttons representing a set of task indications associated with regulatory compliance;
 (ii) receive, from the user via the interactive graphical user interface display, selection of a first icon with the mouse pointer, the first icon representing a selected location from a set of potential locations;
 (iii) retrieve, from the location based regulatory compliance data store, information about the at least one regulatory compliance parameter associated with the selected location;
 (iv) generate, on the interactive graphical user interface display and in response to the retrieved information, a second set of task indications, wherein the second set of task indications is additional information that is provided in response;
 (v) update the interactive graphical user interface display based on the retrieved information about the at least one regulatory compliance parameter associated with the selected location and the set of received task indications associated with regulatory compliance, the update including a link to additional information about the at least one regulatory compliance parameter associated with the selected location;
 (vi) receive a selection of the link;
 (vii) generate a window on the user interface display in response to selection of the link, wherein the window provides the additional information in response to the selection;
 (viii) automatically change a first task indication on the interactive user interface display for a first task to indicate the first task is complete based on a result of a review of at least one source document;
 (ix) receive, from the user via the interactive graphical user interface display, a selection for a report; and
 (x) in response to the selection, transmit the report to another party, the report including an update of the changed task indications; and
 (c) a communication port coupled to the back-end application computer server to transmit data to remote user devices to support the interactive graphical user interface display, including the update, via security features and the distributed communication network.

2. The system of claim 1, wherein the location based regulatory compliance data store comprises a matrix of treaties.

3. The system of claim 2, wherein the user is a life insurance claim handler and the selected locations comprises a resident country of a life insurance policy beneficiary.

4. The system of claim 3, wherein the at least one regulatory compliance parameter comprises a rate of withholding of interest income.

5. The system of claim 4, wherein the regulatory compliance parameters in the matrix of treaties further include at least one of, (i) an article and paragraph number, (ii) an effective date, and (iii) a link to a source treaty document.

6. The system of claim 5, wherein at least one task indication is associated with completion of a portion of a tax form.

7. The system of claim 1, wherein the back-end application computer server automatically establishes a communication link and transmits the report based on the received selection for the report.

8. The system of claim 1, wherein the back-end application computer server reviews at least one source document and automatically generates at least one task indication based on a result of the review.

9. The system of claim 1, wherein the back-end application computer server automatically compiles a set of supporting documents associated with regulatory compliance.

10. A computerized regulatory compliance tool method implemented via a back-end application computer server, comprising:
receiving, at the back-end application computer server from a user via an interactive graphical user interface display, selection of one or more radio buttons with a mouse pointer, the radio buttons representing a set of task indications associated with regulatory compliance;
receiving, from the user via the interactive graphical user interface display, selection of a first icon with the mouse pointer, the first icon representing a selected location from a set of potential locations;
retrieving, from a location based regulatory compliance data store, information about at least one regulatory compliance parameter associated with the selected location, wherein the location based regulatory compliance data store contains electronic records associated with the set of potential locations, each electronic record including an electronic record identifier and at least one regulatory compliance parameter;
generating, on the interactive graphical user interface display and in response to the retrieved information, a second set of task indications, wherein the second set of task indications is additional information provided in response to the selection;
updating the interactive graphical user interface display, with transmitted data via security features, based on the retrieved information about the at least one regulatory compliance parameter associated with the selected location and the set of received task indications associated with regulatory compliance, the update including a link to additional information about the at least one regulatory compliance parameter associated with the selected location;
receiving a selection of the link;
generating a window on the user interface display in response to selection of the link, wherein the window provides the additional information in response to the selection,
automatically changing a first task indication on the interactive user interface display for a first task to indicate the first task is complete based on a result of a review of at least one source document;
receiving, from the user via the interactive graphical user interface display, selection for a report; and
transmitting the report to another party in response to the selection, the report including an update of the changed task indications.

11. The method of claim 10, wherein the location based regulatory compliance data store comprises a matrix of treaties.

12. The method of claim 11, wherein the user is a life insurance claim handler and the selected locations comprises a resident country of a life insurance policy beneficiary.

13. The method of claim 12, wherein the at least one regulatory compliance parameter comprises a rate of withholding of interest income.

14. The method of claim 13, wherein the regulatory compliance parameters in the matrix of treaties further include at least one of: (i) an article and paragraph number, (ii) an effective date, and (iii) a link to a source treaty document.

15. The method of claim 14, wherein at least one task indication is associated with completion of a portion of a tax form.

16. The method of claim 10, wherein the back-end application computer server automatically establishes a communication link and transmits the report based on the received selection for the report.

17. The method of claim 10, wherein the back-end application computer server reviews at least one source document and automatically generates at least one task indication based on a result of the review.

18. The method of claim 10, wherein the back-end application computer server automatically compiles a set of supporting documents associated with regulatory compliance.

19. A non-transitory, computer-readable medium storing instructions, that, when executed by a processor, cause the processor to perform a regulatory compliance tool method implemented via a back-end application computer server, the method comprising:
receiving, at the back-end application computer server from a user via an interactive graphical user interface display, selection of one or more radio buttons with a mouse pointer, the radio buttons representing a set of task indications associated with regulatory compliance;
receiving, from the user via the interactive graphical user interface display, selection of a first icon with the mouse pointer, the first icon representing a selected location from a set of potential locations;
retrieving, from a location based regulatory compliance data store, information about at least one regulatory compliance parameter associated with the selected location, wherein the location based regulatory compliance data store contains electronic records associated with the set of potential locations, each electronic record including an electronic record identifier and at least one regulatory compliance parameter;
generating, on the interactive graphical user interface display and in response to the retrieved information, a second set of task indications, wherein the second set of task indications is additional information provided in response to the selection;
updating the interactive graphical user interface display, with transmitted data via security features, based on the retrieved information about the at least one regulatory compliance parameter associated with the selected location and the set of received task indications associated with regulatory compliance, the update including a link to additional information about the at least one regulatory compliance parameter associated with the selected location;
receiving a selection of the link;

generating a window on the user interface display in response to selection of the link, wherein the window provides the additional information in response to the selection;

automatically changing a first task indication on the interactive user interface display for a first task to indicate the first task is complete based on a result of a review of at least one source document;

receiving, from the user via the interactive graphical user interface display, selection for a report; and transmitting the report to another party in response to the selection, the report including an update of the changed task indications.

20. The medium of claim 19, wherein the location based regulatory compliance data store comprises a matrix of treaties, the user is a life insurance claim handler, and the selected locations comprises a resident country of a life insurance policy beneficiary.

21. The medium of claim 20, wherein the at least one regulatory compliance parameter comprises a rate of withholding of interest income, at least one task indication is associated with completion of a portion of a tax form, and the regulatory compliance parameters in the matrix of treaties further include at least one of: (i) an article and paragraph number, (ii) an effective date, and (iii) a link to a source treaty document.

* * * * *